United States Patent Office 3,345,767
Patented Oct. 10, 1967

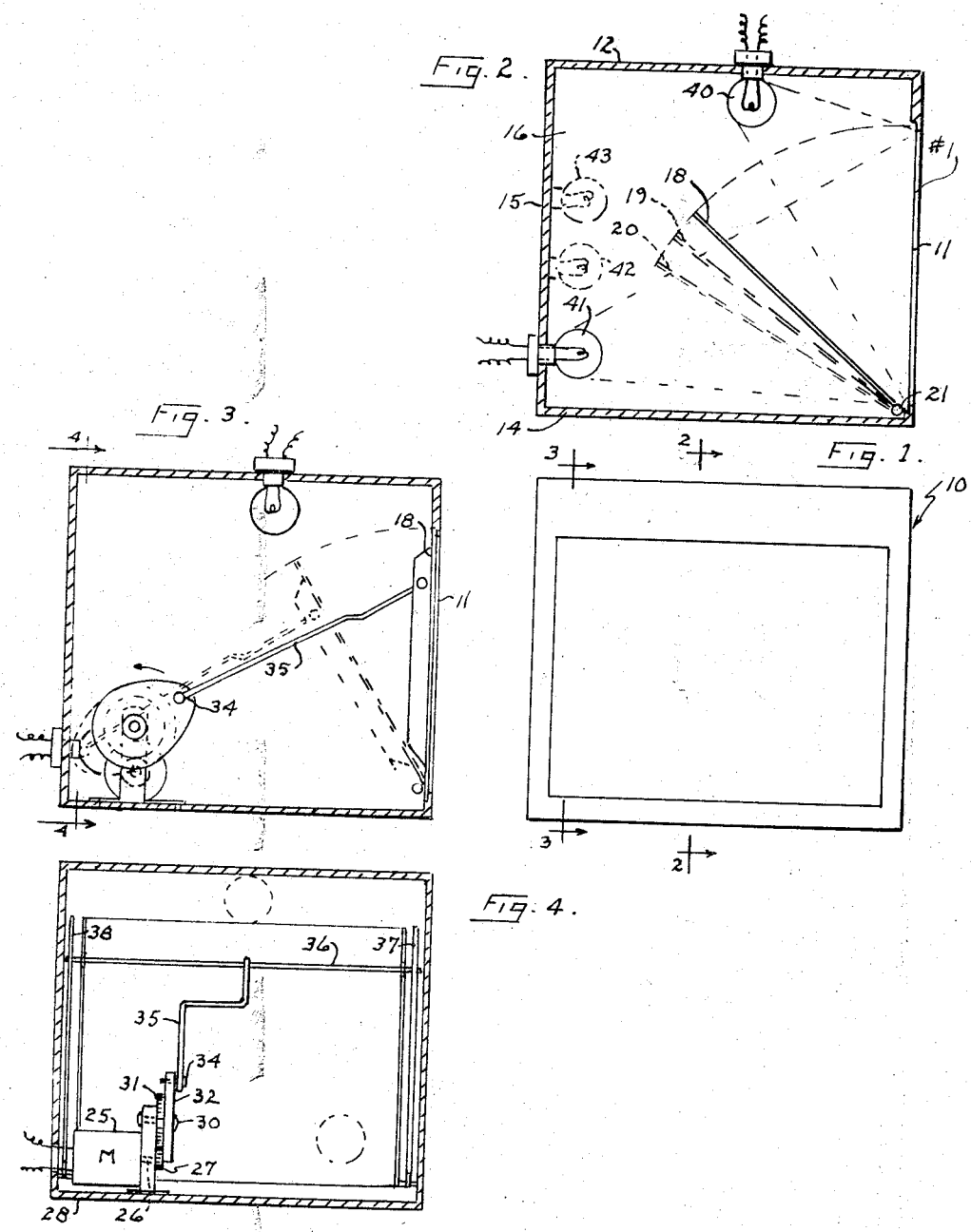

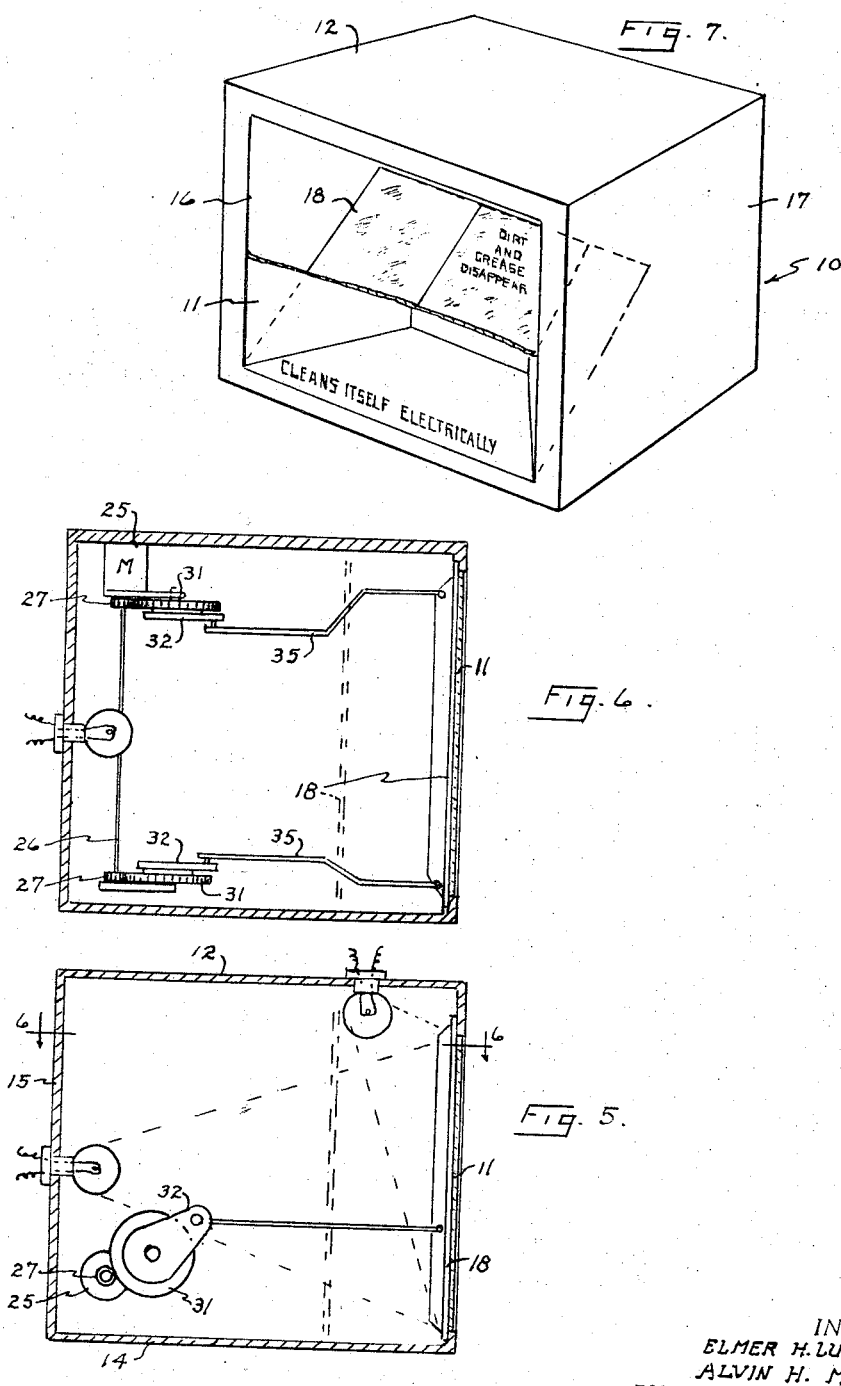

3,345,767
DISPLAY DEVICE
Elmer H. Lusebrink, Morton Grove, and Alvin H. Meyer, Highland Park, Ill., assignors to Ace Finishing Co., Inc., Chicago, Ill.
Filed Oct. 11, 1965, Ser. No. 494,705
8 Claims. (Cl. 40—106.53)

ABSTRACT OF THE DISCLOSURE

A display device having a resemblance to a cooking oven with a glass front and a changing picture visible through the glass front in which the first picture (of the interior of the oven) appears upon a rear illuminated transparent screen and the second picture (the accumulated grease) is movable into contact with said first picture to be similarly illuminated and provide a composite picture and the second picture is movable away from said first picture to gradually lose its illumination from the rear and disappear leaving said first picture of a clean oven.

---

This invention relates to improvements in display devices and more particularly to improvements in display apparatus constructed to be capable of presenting an appearing and disappearing representation successively.

It is an object of this invention to provide a display device which may be self contained and which is relatively simple in its construction and economical in its manufacture and provided to operate on a repeating cycle.

A further object of this invention is to provide a display device in which a first picture appears upon a rear illuminated transparent screen and is visible at all times and in which a second picture is movable into contact with said first picture to be similarly illuminated and provide a composite picture and is movable away from said first picture to gradually lose its illumination from rear and disappear leaving said first picture.

A still further object of this invention is to provide a display device in which a first picture appears upon a transparent screen and is visible at all times and in which a plurality of pictures are movable into abutting relation with said first picture to provide a composite picture and in which any one or all of the plurality of pictures are movable away from said first picture to gradually disappear leaving said first picture.

A further object of this invention is to provide a display device in which a first picture that is printed upon a transparent screen is illuminated from behind said screen to appear upon said screen and in which a second picture printed upon a second screen is movable into contact with said first picture to be similarly illuminated and is seen through said first picture as long as it remains in contact as a composite picture and in which said second picture is movable away from said first picture and due to the reflection of the illumination from said lamp, said second picture is diffused into a nebulous state and disappears from view leaving only said first picture.

Other objects of this invention may be apparent by the accompanying detailed description and the drawings in which FIG. 1 is a front elevational view of the device, FIG. 2 is a cross sectional view taken on line 2—2 of FIG. 1, FIG. 3 is a cross sectional view taken on line 3—3 of FIG. 1, FIG. 4 is a cross sectional view taken on line 4—4 of FIG. 3, FIG. 5 is similar to FIG. 3 illustrating a further embodiment of this invention, FIG. 6 is a plan view taken on line 6—6 of FIG. 5, and FIG. 7 is a perspective illustration of the device.

Referring to the drawings there is illustrated a display device 10 of a boxlike form having a front transparent window 11, a solid top 12, solid bottom 14, solid back 15 and a pair of sides 16 and 17. The transparent window 11 may be provided with a picture or message for display. Mounted within the display device 10 are a plurality of matte faced transparent panels 18, 19 and 20. Panels 18, 19 and 20 are supported by a hinge 21 mounted on the base 14 adjacent the window 11 so that panels 18, 19 and 20 may be moved into abutting relation with window 11 or may be moved away from window 11. In one embodiment of this invention illustrated in FIGS. 3 and 4 there is single panel 18 and within the display device 10 there is mounted a motor 25 with a motor shaft 26, shaft 26 supporting a gear 27. Motor 25 is mounted upon a base 28. An upright 29 from said base 28 supports a shaft 30, a gear 31 is mounted on shaft 30 to mesh with gear 27 and be driven by gear 27. A cam 32 is affixed to gear 31 to be rotated by gear 31. Cam 32 at its maximum diameter is provided with a pin 34. A rod 35 is pivotally attached to pin 34 to be driven in an oscillating movement by pin 34 as cam 32 rotates. Rod 35 may be deformed to permit its opposite end to be mounted in a pivotal connection to the center of a rod 36. Rod 36 extends across the full width of the display device and is mounted in a pair of side elements 37 and 38. The side elements 37 and 38 are affixed to the transparent panel 18 so that with the operation of motor 25 which may be operated by a circuit such as a battery and switch within the device or may be operated by wiring connected to a switch and potential outside the device. With the motor 25 operating, cam 32 may be rotated clockwise as illustrated in FIG. 3 thus rod 35 will pull panel 18 from its full line position illustrated in FIG. 3 to the dotted line position as shown and of course with the continuing rotation of cam 32, panel 18 will be moved back again to the full line position completing a cycle of operation. Also mounted within the display device 10 is a source of illumination such as a lamp 40, or the illumination may be 40 and 41 or a plurality of lamps 40–43. Lamp 40 is positioned at the top of the device affixed to the top 12 and in a position to provide direct illumination to the transparent panel 11 so that any picture or information on panel 11 will be visible and clearly apparent to the observer. A second picture which may complement the picture appearing on panel 11 may be imposed on panel 18 so that with direct illumination of panel 18 and with the operation of motor 25 as panel 18 moves toward the matte faced transparent panel 11 the complementing view or picture upon panel 18 gradually changes from a nebulous diffused picture and comes into focus when in contact with panel 11 and a complete composite picture is seen through panel 11. However as panel 18 is moved away from panel 11, the illumination of lamp 40 will provide reflection from the surface of panel 18 and the picture or information on panel 18 will diffuse and since the detail will be inversely related to the separation distance, it will disappear from view through panel 11. By mounting a second lamp 41 on the back wall 15 of the device, there will be a greater direct illumination through a composite picture to improve detail. In a further embodiment a plurality of lamps 41, 42, 43 may be added. All lamps may be continually illuminated or the lamps may be successively illuminated, that is, lamp 40 must be illuminated first. Lamp 41 will be illuminated when panel 18 moves into abutting relationship with the window. Lamp 42 will be illuminated when panel 19 moves into abutting relationship with 18 and lamp 43 will be illuminated when panel 20 moves into abutting relationship with panel 19. This single panel 18 in a further embodiment may be replaced by a plurality of transparent or translucent panels 18, 19 and 20 thus with additional panels, additional controls such as that illustrated in FIGS. 3 and 4 will be required for the operation of each panel so that one or more panels may be moved in the same manner as the operation of panel 18. Panels 18, 19 and 20 may be transparencies, with or without a matte surface, if a matte surface is used it should face toward panel 11. Thus a single picture appearing on panel 11 may be complemented by a picture on panel 18 and further complemented by a picture on panel 19 and further complemented by a picture on panel 20. This is but one example, that is, the number of panels utilized may vary. The total result being a multiple picture appearing through panel 11. Referring to FIG. 7 as a specific example of the type of picture that may be utilized in this device, panel 11 illustrates the interior of an oven and is perfectly clean in its appearance. However the next panel 18 is provided to appear with a great deal of charred dirt and grease upon the walls. Thus when panel 18 is in the position as illustrated in FIG. 7, the viewer will see a perfectly clean oven as shown in the lower half of the picture. However when panel 18 is moved into an abutting relationship with panel 11, the oven will appear to be completely covered with charred dirt and grease. In this advertisement the oven is to be cleaned electrically, that is, by heat and there is a pictorial illustration of the manner in which the grease and dirt disappears, that is, when the cleaning operation is started, panel 18 is abutting panel 11. Gradually panel 18 is moved away from panel 11 thus simulating the gradual disappearance of the grease and dirt from the walls of the oven as it is being treated electrically to clean it.

Referring to FIGS. 5 and 6 there is illustrated a further embodiment of this invention in which panel 11 is the same as illustrated in the prior embodiment however panel 18 is mounted to remain in parallel relationship with panel 11 but is moved in the same manner as the prior panel 11 so that it will abut with panel 11 for a composite picture and will move away from panel 11 remaining in parallel relationship to a position as illustrated in dotted lines at which the composite picture disappears completely from the viewer and only the picture upon panel 11 remains. The operating mechanism is the same as the prior embodiment utilizing a motor 25. However shaft 26 extends across the device so that a pair of gears 27 may be mounted at either end of shaft 26, gears 27 driving a pair of gears 31, gears 31 driving a pair of cams 32 and cams 32 each driving separate rods 35 in synchronism so that rods 35 attached to either end of panel 18 move panel 18 back and forth while retaining it in a parallel relationship with panel 11. Referring to the panels 11, 18, 19 and 20 although each may be a transparency, they must have a matte face. Panels 11, 18, 19 and 20 should have optical properties that is almost transparent when contacting an object but due to matte back up surface they become opaque when moved away from that object or when viewed in space. A further feature of this device and the transparencies utilized is that panel 11 should have the matte surface toward the interior of the device and the picture or information desired on panel 11 should be on the outside surface. Referring to panels 18, 19 and 20 the matte surface should be toward panel 11 and the picture or information to be printed thereon should be on the surface away from panel 11. Thus, referring to FIG. 2 the direct illumination from the lamp 40 provides a complete illumination of the picture on panel 11 while lamp 40 provides a reflection of its light from the matte surface of panel 18 so that it is impossible to see any information on panel 18. However as panel 18 moves toward panel 11 and moves out of the angle at which lamp 40 may provide reflection, the illumination from lamp 41 through panel 18 becomes apparent through panel 11 but the picture is nebulous and as panel 18 advances toward panel 11 the nebulous image or information becomes sharper and the image or picture becomes clear when they are in juxta-position at which time there is a composite picture through panel 11. It is to be noted that screen dwell or mix times for composite pictures are controlled by the geometric relationship of crank, scene pivot point and direction of crank rotation. The lamp or lamps for illumination need not be on continuously but they may be synchronized, that is, turned on and off by cam 32 during its rotation.

Although we have illustrated a device 10, the particular box-like form of the device may be varied according to the desired information or picture, that is, it may be elongated or shaped into peculiar shapes or changed as desired and although a front window or panel has been shown, the window or panel need not be affixed to the display device, and although a particular form of operating the movable panels has been disclosed any manner of moving the panels in this particular fashion may be utilized without departing from the spirit of this invention and although the lamps for illumination have been shown in a particular position, they may be moved to any desirable position as long as they perform the same function as described and although this device has been described as simply using a lamp for illumination, the intensity of the light from the lamps may be varied to produce a different result and a combination of colored lamps may be used to produce different colors in the picture as desired without departing from the spirit of this invention and this invention shall be limited only by the appended claims.

What is claimed is:

1. A display apparatus comprising in combination a casing, a front window in said casing, a panel mounted adjacent said window and pivotally movable away from said front window in said casing, a source of illumination within said casing, said window provided with display information on the exterior surface of said window, said panel being transparent and provided with a matte surface toward the interior of said casing and further display information on the surface of said panel facing said window, means for pivotally moving said panel into abutting relationship with said window to provide a composite picture through said window, means for pivotally moving said panel away from said window to diffuse and eliminate a portion of said composite picture.

2. In a device according to claim 1 in which said source of illumination is a lamp mounted within said casing in the upper front portion of said casing to provide direct illumination upon the interior surface of said window and to provide direct illumination upon the face of said movable panel that faces said window when said panel is moved away from said window to provide reflected light toward said window.

3. In a device according to claim 1 in which said panel is affixed by a hinge adjacent said window to permit said panel to swing pivotally into abutting relation with said window and away from said window and in which a motor, cam and crank are provided as the means of moving said panel.

4. In a device according to claim 1 in which said panel is mounted in a parallel abutting relationship to said window and said panel is moved pivotally away from said window while retained in its aligned relationship and in which a motor, a pair of cams and a pair of cranks are provided as the means of pivotally moving said panel.

5. A display apparatus comprising in combination a casing, a front window in said casing, a plurality of movable panels mounted in said casing adjacent said window in which the first panel may be moved in juxta-position to said window, a source of illumination within said casing, said window provided with display information on the exterior surface of said window, said panels being transparent and each panel provided with a matte surface toward the interior of said casing and further display information on the surface of sad panels facing said window, means for guiding said movable panels so that the first panel abuts with said window and each successive panel moves into abutting relationship to provide a composite picture through said window, means for moving each movable panel successively away from said window to diffuse and eliminate portions of said composite picture.

6. In a device according to claim 5 in which said source of illumination is a lamp mounted in the upper front portion of said casing to provide direct illumination upon the interior surface of said window and to provide direct illumination upon each face of each movable panel that faces said window as each panel is moved away from said window to provide reflected light toward said window.

7. In a device according to claim 5 in which each panel is affixed by a hinge adjacent said window to permit said first panel to be in juxta-position to said window and in which each successive panel will swing into abutting relation and away from said abutting relation and in which a motor, cams and cranks are provided as the means of moving said panels.

8. In a device according to claim 5 in which a plurality of lamps are provided and in which said lamps are of different colors and in which the first lamp illuminates said window and in which the second lamp is illuminated with the movement of the first panel into abutting relationship with said window and in which each successive lamp is illuminated with the movement of each successive panel into abutting relationship to provide a complete composite picture.

References Cited

UNITED STATES PATENTS 1,460,674   7/1923   Hutchings _____ 40—106.53

FOREIGN PATENTS 28,321   9/1931   Australia.

EUGENE R. CAPOZIO, *Primary Examiner.*

W. J. CONTRERAS, *Assistant Examiner.*